United States Patent [19]

Ashwell

[11] Patent Number: 5,786,089
[45] Date of Patent: Jul. 28, 1998

[54] Z-TYPE FILMS FOR SECOND HARMONIC GENERATION

[75] Inventor: Geoffrey Joseph Ashwell, Shelfleys, England

[73] Assignee: British Technology Group Ltd., London, England

[21] Appl. No.: 591,445

[22] PCT Filed: Aug. 11, 1994

[86] PCT No.: PCT/GB94/01760

§ 371 Date: Jan. 29, 1996

§ 102(e) Date: Jan. 29, 1996

[87] PCT Pub. No.: WO95/04953

PCT Pub. Date: Feb. 16, 1995

[30] Foreign Application Priority Data

Aug. 11, 1993 [GB] United Kingdom ............... 9316662

[51] Int. Cl.[6] ........................................ B32B 9/04
[52] U.S. Cl. ............................. 428/411.1; 428/1; 428/704; 428/910; 428/913
[58] Field of Search ........................ 428/1, 411.1, 913, 428/910, 704

[56] References Cited

U.S. PATENT DOCUMENTS 5,510,200  4/1996  Ashwell ................... 428/411.1

FOREIGN PATENT DOCUMENTS

| 0 203 780 | 12/1986 | European Pat. Off. . |
| 0 432 619 A3 | 6/1991 | European Pat. Off. . |
| WO 89/05843 | 6/1989 | WIPO . |
| WO 90/13055 | 11/1990 | WIPO . |
| WO 92/09374 | 6/1992 | WIPO . |

Primary Examiner—Leszek Kiliman
Attorney, Agent, or Firm—Nixon & Vanderhye

[57] ABSTRACT

Optically non-linear materials suitable upon repeated Langmuir-Blodgett dipping for forming Z-type (head-to-tail) films for second harmonic generation include hemicyanine dyes which are very unsymmetrical, i.e. which have hydrophobic substituents differing in size by at least 4 carbon atoms, each end of a hydrophilic chromophore. A suitable dye is E-N-octadecyl-4-[2-(4-dibutylaminophenyl) ethenyl]quinolinium iodide.

12 Claims, No Drawings

Z-TYPE FILMS FOR SECOND HARMONIC GENERATION

The present invention relates to optically non-linear materials suitable for forming Z-type films for second harmonic generation, to methods for their synthesis and to optical devices which incorporate such materials.

WO 89/05843 discloses amphiphilic hemicyanines such as 4-{2-[4'-(N,N-didecylamino)-biphenyl-4,4'-diyl]-ethenyl}-1-butylpyridinium iodide, useful as non-linear optical media, which may form Langmuir-Blodgett films of non-centrosymmetric chromophores.

EP-A-203780 discloses a multi-layer Langmuir-Blodgett film having non-linear optical properties, consisting of alternating layers of differently substituted asymmetric hemicyanine dyes.

EP-A423619 discloses various compounds which can be deposited by Langmuir-Blodgett techniques to form films for non-linear-optics purposes.

Film-forming hemicyanine dyes of general formula D—$C_6H_4$—CH=CH—$C_5H_4N^+$—R $X^-$ where D is an electron donating group, R is a hydrophobic alkyl group and $X^-$ is a simple inorganic anion such as a halide ion have been extensively studied for second harmonic generation (SHG). Their properties are dependent upon the donor group (Bubeck et al, Advanced Materials 1991, 3, 54), the counterion (Liu et al, Thin Solid Films 1992, 219 221; Ashwell et al Nature 1992, 357 393) and the extent of aggregation (Girling et al, Thin Solid Films 1985, 132, 101; Schildkraut et al., Opt. Lett 1988, 13 134). In our International PCT Publication WO 93/24859 we have disclosed that Langmuir-Blodgett (LB) film structures which generate a signal of greater intensity may be produced by utilising an amphiphilic anion rather than a simple inorganic anion. For these known LB film-forming materials, it has been assumed that there is a requirement for the cation to be amphiphilic with a long hydrophobic tail group attached to one end of the hydrophilic chromophore, this being necessary so that the film-forming molecules may be aligned at the air/water interface, with the head groups downwards. Such films typically display centrosymmetric interlayer arrangements with the molecules packing head-to-head and tail-to-tail (Y-type). The molecules tend to "flip" over to retain the hydrophobic parts together but a non-centrosymmetric structure has been obtained by the incorporation of spacer layers between the active LB layers (International Patent Application WO 92/09374).

We have now discovered that, in film forming hemicyanine dyes, a more favourable non-centrosymmetric, head-to-tail, Z-type, packing arrangement may be produced by ensuring that the hydrophilic chromophore is substituted at opposite ends by hydrophobic alkyl, alkenyl or alkylaryl groups comprising from 4 (less than 4 would be insufficiently hydrophobic) to 30 carbon atoms, in which the groups at each end differ in size by four or more carbon atoms, e.g. dihexyl (12C) and octadecyl (18C), difference= 6C. A difference of at least four carbon atoms is necessary for Z-type packing, if the inconvenience of intermediate layers of a different compound is to be avoided.

Preferred cationic dyes of use in the present invention are those of general formula R'D—π—A—R (neutral) or R'D—π—$A^+R$ (cationic) wherein R'D represents a hydrophobic donor group; π represents a conjugated π-electron bridging group; A and $A^+$ represent electron acceptor groups having hydrophobic substituents R.

Preferably R'D represents an N-alkylamino, N,N-diallylamino, alkoxy, carboxylate R'C(O)O—, alkylthio or alkylseleno group and A-R represents a keto (RC(O)—) or ester (ROC(O)—) group. $A^+$ represents a heterocyclic group such as a pyridinium, pyrimidinium, quinolinium, isoquinolinium, benzothiazolium or thiazolium cation and R is preferably attached to the heteroatom. $A^+$ may be optionally substituted.

R and R' represent hydrophobic alky, alkenyl or alkylaryl groups comprising 4 to 30 carbon atoms, R and R' being the same or different, optionally differing by four or more carbon atoms. The π-bridge is —CH=CH—, —CH=N—, —N=N—, —Ar— or multiples or combinations thereof, wherein Ar represents an aromatic ring especially a benzene or pyridine ring, the π group being optionally substituted.

The counterion may be any conventional anion of use in such Langmuir-Blodgett films. Preferably, the anion is a halide or an amphiphilic anion such as those disclosed in UK Patent Application Publication GB 2267288A.

Examples of dyes of the type described include
E-N-octadecyl-4-[2-(4-dibutylaminophenyl)ethenyl] quinolinium iodide,
E-N-octadecyl-4-[2-(4-dibutylaminophenyl)ethenyl] pyridinium iodide,
E-N-octadecyl-4-[2-(4-dihexylaminophenyl)ethenyl] pyridinium iodide,
E-N-decyl-4-[2-(4-docosyloxyphenyl)ethenyl]pyridinium bromide,
E-N-dodecyl-4-[2-(4-docosyloxyphenyl)ethenyl] pyridinium bromide,
E-N-tetradecyl-4-[2-(4-docosyloxyphenyl)ethenyl] pyridinium bromide,
E-N-hexadecyl-4-[2-(4-docosyloxyphenyl)ethenyl] pyridinium bromide,
E-N-octadecyl-4-[2-(4-docosyloxyphenyl)ethenyl] pyridinium bromide,
E-N-eicosyl-4-[2-(4-docosyloxyphenyl)ethenyl]pyridinium bromide,
E-N-docosyl-4-[2-(4-tridecanoyloxyphenyl)ethenyl] pyridinium bromide,
E-N-dodecyl-4-[2-(4-docosylthiophenyl)ethenyl] pyridinium iodide,
E-N-dodecyl-2-[2-(4-octadecylaminophenyl)ethenyl] benzothiazolium iodide,
E-N-hexadecyl-2-[2-(4-docosylaminophenyl)ethenyl] benzothiazolium octadecylsulphate, and
E-N-octadecyl-5-[(4-dibutylaminophenyl)methylene]-6,7, 8-trihydroisoquinoliniu m octadecylsulphate.

The novel dyes of this invention (as listed above) may be conveniently prepared by, for example, the reaction of an N-alkyl-4methylpyridinium halide, a para-substituted benzaldehyde and piperidine in hot methanol. The product may be purified or may be used directly in the production of optically non-linear Langmuir-Blodgett films. Alternatively the dyes can be mixed with, for example, sodium octadecylsulphate on the aqueous subphase of the Langmuir-Blodgett trough to form the octadecylsulphate salt. The inorganic salt produced by the metathesis reaction migrates into the subphase.

The novel dyes may be formed into optically non-linear films using conventional techniques and a further aspect of the invention relates to such films. Conveniently they may be spread as a solution in dilute methanol/chloroform or dichloromethane onto the pure water subphase of a Nima Technology Trough and transferred on the upstroke to a glass side.

The invention is illustrated by the following examples.

EXAMPLE 1

The optically non-linear dye, E-N-octadecyl-4-[2-(4-butylaminophenyl)ethenyl]-quinolinium iodide, was spread from Aristar grade dichloromethane onto the pure water subphase of compartment A of a Nima Technology LB trough. After evaporation of the solvent the surface layer was slowly compressed to 35 mN/m, and then it was transferred to a glass microscope slide by raising it at 3 mm/min through the floating monolayer. Z-type film structures were obtained by repeating the process, for example, by cycling the slide via compartment B, under the fixed surface barrier and up through the floating monolayer.

SHG measurements were carried out using the apparatus described previously (Ashwell et al., SPIE—Intl Soc. Opt. Eng. 1991, 1361, 569), with a pulsed Nd:YAG laser ($\lambda$ 1064 nm) and Y-cut quartz plate as reference. The SHG increased quadratically with the number of layers indicating a non-centrosymmetric LB film structure.

EXAMPLE 2

Non-centrosymmetric Z-type multilayers of the related pyridinium dye, E-N-octadecyl4[-2-(4-dibutylaminophenyl) ethenyl]pyridinium iodide, were obtained using the technique described above. The SHG increased quadratically with the number of layers.

EXAMPLE 3

Non-centrosymmetric Z-type multilayers of E-N-octadecyl-4-[2-(4-dihexylaminophenyl)ethenyl]pyridinium iodide, were obtained using the technique described above. The SHG increased quadratically with the number of layers.

EXAMPLE 4

Non-centrosymmetric Z-type multilayers of E-N-alkyl-4-[2-(4-docosyloxyphenyl)ethenyl]pyridinium bromide, wherein the alkyl group was, in successive experiments, decyl, dodecyl, tetradecyl, hexadecyl, octadecyl, eicosyl and docosyl, were obtained using the technique described above. In each experiment the SHG increased quadratically with the number of layers.

EXAMPLE 5

Non-centrosymmetric Z-type multilayers of E-N-octadecy-4-[2-(4-octadecyloxyphenyl)ethenyl]pyridinium iodide, were obtained using the technique described above. Films comprising from 1 to 120 non-centrosymmetic layers were fabricated and the SHG increased quadratically with the number.

I claim:

1. A film forming hemicyanine dye comprising a hydrophilic chromophore substituted at both ends by hydrophobic alkyl, alkenyl or alkylaryl groups comprising from 4 to 30 carbon atoms, the dye having the formula:

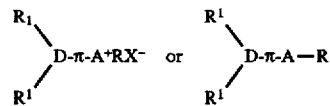

where $(R^1)_2D$ is a hydrophobic electron donating group and A is an electron accepting group substituted by a hydrophobic group R, $\pi$ is a conjugated bridging group and $X^-$ is a counterion, in which $R^1$ is butyl to hexyl and R has at least sixteen carbon atoms.

2. A dye according to claim 1, wherein $A^+$ represents a heterocyclic group.

3. A dye according to claim 2, wherein $A^+$ represents a pyridinium, pyrimidinium, quinolinium, isoquinolinium, oxazolium, thiazolium or benzothiazolium cation.

4. A dye according to claim 2, wherein R is attached to the heteroatom.

5. A dye according to claim 4, wherein $A^+$ is substituted.

6. A dye according to claim 1, wherein $X^-$ is a halide.

7. A dye according to claim 1, wherein $X^-$ is amphiphilic.

8. A dye according to claim 1, wherein AR represents a keto (RC(O)—) or an ester (ROC(O)—) group.

9. A dye according to claim 1, wherein $(R^1)_2D$ represents a N,N-dialkylamino group.

10. A dye according to claim 1, wherein $\pi$ represents a group selected from —CH=CH—, —CH=N—, —N=N—, and Ar where Ar represents an aromatic ring or multiples or combinations thereof.

11. A dye according to claim 10 wherein $\pi$ is substituted.

12. A non-centrosymmetric Langmuir-Blodgett film consisting of a plurality of layers in Z-type arrangement of a dye being any one of the following compounds:

E-N-octadecyl-4-[2-(4-dibutylaminophenyl)ethenyl] pyridinium iodide;

E-N-octadecyl-4-[2-(4-dibutylaminophenyl)ethenyl] quinolinium iodide;

E-N-octadecyl-4-[2-(4 dihexylaminophenyl)ethenyl] pyridinium iodide;

E-N-decyl-4-[2-(4-docosyloxyphenyl)ethenyl] pyridinium bromide;

E-N-dodecyl-4-[2-(4-docosyloxyphenyl)ethenyl] pyridium bromide;

E-N-tetradecyl-4-[2-(4-docosyloxyphenyl)ethenyl] pyridinium bromide

E-N-hexadecyl-4-[2-(4-docosyloxphenyl)ethenyl] pyridinium bromide

E-N-octadecyl-4-[2-(4-docosyloxyphenyl)ethenyl] pyridinium bromide

E-N-eicosyl-4-[2-(4-docosyloxyphenyl)ethenyl] pyridinium bromide

E-N-docosyl-4-[2-(4-tridecanoyloxyphenyl)ethenyl] pyridinium bromide

E-N-dodecyl-4-[2-(4-docosylthiophenyl)ethenyl] pyridinium iodide

E-N-dodecyl-2-[2-(4-octadecylaminophenyl)ethenyl] benzothiazolium iodide;

E-N-hexadecyl-2-[2-(4-docosylaminophenyl)ethenyl] benzothiazolium octadecylsulphate; or E-N-octadecyl-5-[(4-dibutylaminophenyl)methylene]-6, 7,8-trihydroisoquinolinium octadecylsulphate.

* * * * *